United States Patent [19]

Yamazaki et al.

[11] 4,240,307
[45] Dec. 23, 1980

[54] PARKING BRAKES

[75] Inventors: Takeo Yamazaki, Anjoshi; Shigeki Miyagishi, Toyotashi, both of Japan

[73] Assignee: Aisin Seiki Kabushiki Kaisha, Kariyashi, Japan

[21] Appl. No.: 944,204

[22] Filed: Sep. 20, 1978

[30] Foreign Application Priority Data

Sep. 25, 1977 [JP] Japan .................................. 52-115055

[51] Int. Cl.³ .............................................. G05G 5/06
[52] U.S. Cl. ........................................ 74/503; 74/540
[58] Field of Search ................. 74/502, 503, 529, 537, 74/540

[56] References Cited

U.S. PATENT DOCUMENTS

| 2,190,087 | 2/1940 | Snell | 74/503 |
| 2,598,133 | 5/1952 | Roesch | 74/503 |
| 2,632,338 | 3/1953 | Sandberg | 74/503 |
| 2,751,794 | 6/1956 | Sandberg et al. | 74/503 |

Primary Examiner—Kenneth Dorner
Attorney, Agent, or Firm—Oblon, Fisher, Spivak, McClelland & Maier

[57] ABSTRACT

Locking mechanisms for a hand-operated parking brake having an elongated pulling plunger at a free end of which is a manipulating handle and a locking member normally spring biased toward locking engagement with the plunger and provided with a hook adjacent to the handle so as to be clasped in the driver's palm together with the handle without any conscious effort when the handle is manipulated by the driver for being pulled, whereby the locking member is slightly pulled by the driver immediately prior to pulling of the handle for unlocking the plunger in order to release the parking brake.

5 Claims, 8 Drawing Figures

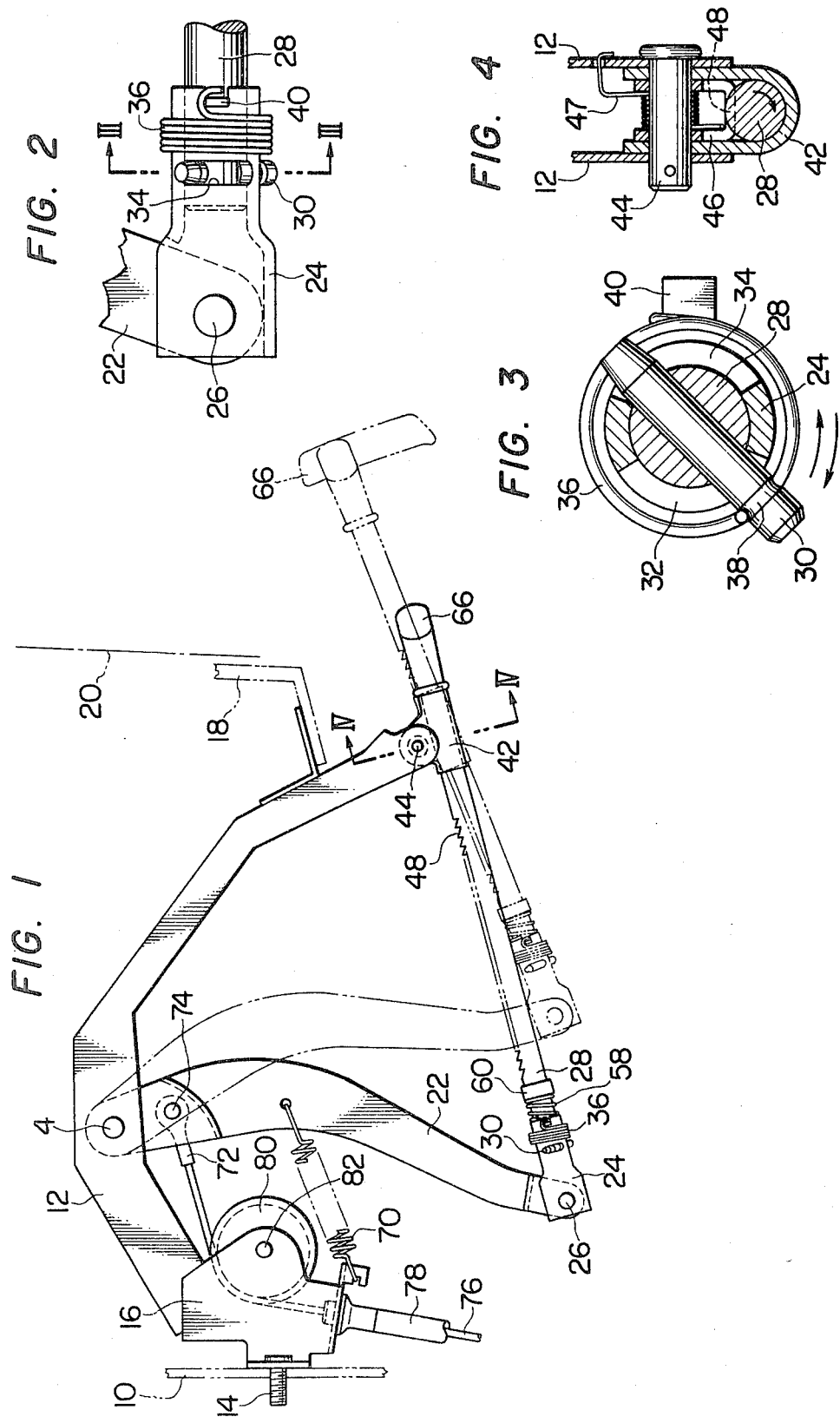

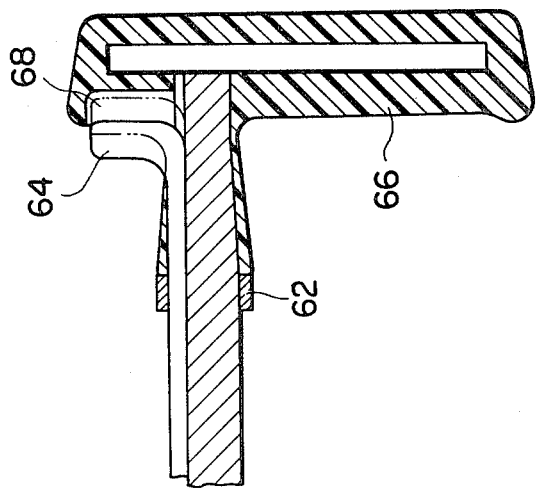
FIG. 5
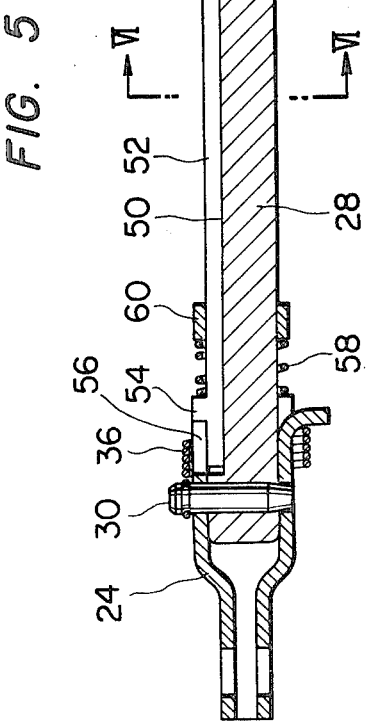
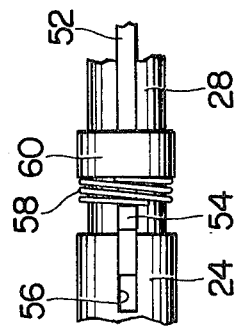
FIG. 8
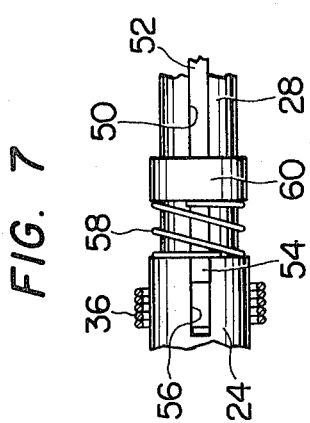
FIG. 7
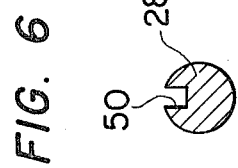
FIG. 6

4,240,307

PARKING BRAKES

BACKGROUND OF THE INVENTION

1. Field of the Invention

This invention relates to improvement in hand operated parking brakes of vehicles and more particularly brake levers free from unintentional release in case of accidental contact with any body part of the driver or the front seat passenger.

2. Description of the Prior Art

For the hand brakes of this type, it is required that the unintentional release is avoided for safety purpose even though the driver or the front seat passenger inadvertently contacts a manipulating handle of the brake in a set condition.

The present invention is directed to a provision of an improved hand operated parking brake which is ensured in its set condition during brake application against any inadvertent contact with the body part of the driver or the passenger.

SUMMARY OF THE INVENTION

Therefore it is a main object of the invention to provide means for insuring the hand brake in set condition against an unintentional contact with the driver or the front seat passenger.

The above object and others are attained according to at least one aspect of provision of means for locking the hand brake to its set condition when the brake is being applied without necessity of any conscious effort and releasing such locked condition also without necessity of conscious effort when the brake is being released.

With these object and other in view, the present invention comprises a fixed bracket, a lever pivotally mounted on a shaft on the bracket and being connected with a brake cable, a sleeve pivotally mounted on a shaft on the free end of the lever normal to a plane in which pivots the lever, a plunger having a handle at its free end to be gripped in the driver's palm for being pulled when the parking brake is applied, the plunger being connected with the sleeve rotatably around the axis of the plunger through an angle and normally spring-urged toward rotation in one direction and provided with a longitudinal series of ratchet teeth and spring means normally urging the plunger reversely to the pulling direction of the plunger, a guide member on the bracket for supporting the plunger slidingly and swingably in the plane, a pawl normally spring-urged toward engagement with the ratchet teeth against the bias of the spring means, a locking member mounted on and longitudinally extending along the plunger in sliding fit relation therewith, said sleeve further being provided with means for engaging the terminal end of the locking member to thereby lock the plunger against rotation around its axis, second spring means normally urging the locking member toward engagement with the engagement means of the sleeve and a hook at an end of the locking member adjacent the handle of the plunger at the opposite side to the driver to be gripped in the driver's palm together with the handle when the brake is applied without any conscious effort.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through out the several views, and wherein:

FIG. 1 is a elevational view of a parking brake assembly made in accordance with the present invention;

FIG. 2 is a partial elevational view of the parking brake assembly of FIG. 1 in enlarged scale;

FIG. 3 is a cross sectional view taken along the line III—III in FIG. 2;

FIG. 4 is a cross sectional view taken along the line IV—IV in FIG. 1;

FIG. 5 is an axial cross sectional view of a main part of the parking brake of FIG. 1;

FIG. 6 is a cross sectional view taken along the line VI—VI in FIG. 5;

FIG. 7 is a partial plan view of the brake of FIG. 1; and

FIG. 8 is a similar view to that of FIG. 7.

DESCRIPTION OF THE PREFERRED EMBODIMENT

Referring now to the drawings, reference numeral 10 at the left in FIG. 1 designates a dash pannel of a vehicle. To the dash pannel is secured a generally arcuate bracket 12 at its left extremity by means of a bolt 14, and a fastening member 16. The fastening member 16 is integrally formed with the bracket 12 through means of, for example, a spot type electric welding technique. At the right hand end of the bracket 12 is integrally fastened by similar means of welding another fastening member 18 which is in turn bolted to an instrument board shown in phantom in the view at 20. It will be noted that the brake assembly is disposed in front of the driver's seat of a vehicle, so as to be manipulated by the driver when the parking brake is applied or released.

A lever 22 is pivoted to the bracket by means of a pin 4. The bracket 12 has U-shaped cross section and the lever 22 is pivotable at its uppermost end in the U-shaped spaced. The lever 22 is rotatably connected at its lowermost end to a sleeve 24 by means of a pin 26. The left half of the sleeve 24 is of also U shape cross section within which is pivotal the lever 22. The right half of the sleeve 24 is in tubular form and a plunger 28 is rotatably received in the tubular form portion as shown in greater detail in FIGS. 2 and 3. The plunger 28 has a radial pin 30 at its end, opposite ends of which protrude a suitable length from the external face of the plunger 28 as seen in each view. The sleeve 24 is formed with a pair of circumferently elongated holes 32 and 34 within which are free to slide the oppositely projecting ends of the pin 30 respectively. Since the holes 32 and 34 are symmetrically located with respect to the central axis of the sleeve 24, the pin 30 is permitted to rotate around the central axis through an angle dependent upon the length of the holes 32 and 34. It should be noted that the both holes are of identical length.

A torsion coiled spring 36 is anchored at one end to an annular groove 38 of the pin 30 and, at the other end, is anchored to a swaged out projection 40 of the sleeve 24 as shown in FIG. 2. The pin 30 is normally spring loaded to have its ends abut respectively against terminal ends of the holes 32 and 34 as will be seen in FIG. 3. The plunger 28 is rotated through the angle against the force of the torsion spring 36 as will be described in greater detail later.

The plunger 28 is sliding fit at its right hand end portion within a tubular guide 42, a central portion of which is of U shaped cross section and is pivoted to the bracket 12 by means of a pin 44. Copivoted by the pin 44 is a pawl 46 in the guide 42 as seen in FIG. 4. The pawl 46 is of U-shaped cross section and the bottom portion of the U-shaped cross section engages ratchet teeth 48 of the plunger 28, as shown in dotted line in FIG. 4. A torsion spring 47 is anchored at its one end to the bracket as shown in FIG. 4 and at the other end to the pawl 46 so that the pawl 46 is normally spring urged toward engagement with the ratchet teeth 48.

Referring now to FIG. 5, the plunger 28 has an axially extending groove 50 in which is slidingly fit a locking member 52. The locking member 52 has at its left end a projection 54 protruding out of the groove 50 as seen in FIG. 5. As shown in FIG. 7, the sleeve 24 has a recessed portion 56 in alignment with which the groove 50 of the plunger 28 locates in its rest position. The recessed portion 56 slidably receives the projection 54. A compressed coiled spring 58 is anchored at one end to the projection 54 and at the other end to a collar 60 fastened on the plunger 28. Another collar 62 is fastened on the plunger at the right end portion in order to prevent the locking member 52 from falling out of the groove 50. The locking member 52 has at its right hand end a hooked portion 64 as shown in FIG. 5. A handle 66 formed of synthetic resin material is integrally connected to the plunger 28 for pulling and rotation around its axis, when the brake is applied or released, respectively. The handle 66 has a recessed portion 68 to accomodate the hook 64.

Referring back to FIG. 1, a tensioned coiled spring 70 is anchored at one end to the lever 22 and at the other end to the fixed fastening member 16 for normally urging the lever to the left in the view. A brake cable 76 is pivotally connected to lever 22 as at 74 by means of clevis 72. The numeral 78 designates a bearing grommet mounted in a hole in the fastening member 16 for slidingly receiving the brake cable 76. A pully 80 is rotatably supported at 82 by the fastening member 16 and receives the brake cable 76 for guiding. The brake cable 76 connects in a conventional manner to a wheel brake of the vehicle.

In the retracted position of the brake, every part occupies the position shown in full line in FIG. 1. When the parking brake is to be applied, the driver pulls the handle 66 rightward so that the lever 22 and plunger 28 are displaced to the dot-and-dash line position in this view. In this condition, the hook 64 of the locking member 52 is clasped together with the handle 66 in the driver's palm without necessity of any conscious effort so that the locking member 52 is displaced relative to the plunger 28 with the coiled spring 58 is further compressed. The projection 54 of the locking member 52 is accordingly displaced to the right so as to disengage from the recessed portion 56 of the sleeve 24. However, in case of brake application, the above behavior of the projection 54 is unnecessary since rotation of the plunger 28 is not needed but mere pulling of the plunger is needed until tension of the cable 76 is sensed by the driver proportional to a required braking effect. The instant the driver releases the handle 66, the ratchet teeth of the plunger 28 is caused to engage the pawl 46 both under pull of the parking brake cable 76 and the tension of the spring 70, so that the parking brake is held in set condition in which the lever 22 and the plunger 28 occupy the positions shown in dot-and-dash lines respectively in FIG. 1.

In the set condition, the projection 54 engages the recessed portion 56 of the sleeve 24 as seen in FIG. 7 so that the plunger 28 is impossible to rotate about its axis, thereby being locked in the set condition. Any driver's contact with the manipulating handle 66 does not cause the plunger to rotate and be released from the set condition except upon pulling of the hook 64.

In case of release of the parking brake, the driver clasps the handle 66 in the usual manner and pulls the same to the right slightly but sufficiently to disengage the pawl 46 from the ratchet tooth. In this condition, the hook 64 is unconsciously clasped in the driver's palm together with the handle 66 and pulled together to the right in FIG. 1. The projection 54 is therefore disengaged from the recess 56 as shown in FIG. 8. The plunger 28 is therefore permitted to rotate about its axis so that the ratchet tooth 48 disengages from the pawl 46 thereby being retracted to its rest positon both upon pulling of the brake cable and tension of the spring 70. The instant the driver rotates the plunger until ratchet tooth disengages from the pawl and releases the handle 66, pulling of the brake cable 76 and the tension of the spring 70 causes the plunger to retract to its retracted position in which the handle abuts against the guide 42 as shown in FIG. 1 in full line. The parking brake is thus released.

Obviously, many modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A hand-operated parking brake mechanism, comprising:

a fixed bracket;

a lever having a free end pivotally mounted on a first shaft on the bracket and being connected with a brake cable;

a sleeve pivotally mounted on a second shaft on the free end of the lever, said second shaft extending normal to a plane in which the lever pivots;

a plunger having a handle at a free end to be gripped in a driver's palm for being pulled when the parking brake is applied, the plunger being rotatably connected with the sleeve whereby the plunger may rotate about its longitudinal axis through an angle and is provided with a longitudinal series of ratchet teeth;

first spring means urging said plunger toward rotation in one direction and second spring means normally urging the plunger reversely to the pulling direction of the plunger, a guide member on the bracket for supporting the plunger slidably and swingably in the plane, a pawl, third spring means normally urging said pawl toward engagement with the ratchet teeth, a locking member mounted on and longitudinally extending along the plunger in sliding fitted relation therewith, said sleeve further being provided with means for engaging the terminal end of the locking member to thereby lock the plunger against rotation around its axis, fourth spring means normally urging the locking member toward engagement with the means for engaging the terminal end of the locking member, and a hook at an end of the locking member adjacent the handle of the plunger at the opposite side to the driver to be gripped in the driver's palm together with the handle when the brake is applied without any conscious effort.

2. A hand-operated parking brake as set forth in claim 1, wherein said guide member is of tubular form adapted to slidably rotatably receive therein the plunger and said pawl is pivoted to said guide member for engaging the ratchet teeth of the plunger.

3. A hand-operated parking brake as set forth in claim 1, wherein said means for engaging the terminal end of the locking member comprises a recessed portion in the wall of the tubular sleeve adapted to mesh with the end of the locking member whereby the plunger is locked to the sleeve for preventing its rotation around the axis thereof.

4. A hand-operated parking brake as set forth in claim 2, wherein said guide member has a U-shaped cross-section portion and said pawl is pivoted to the guide member with the extremity thereof normally spring-urged toward engagement with said ratchet teeth of said plunger.

5. A hand-operated parking brake as set forth in claim 3, wherein said plunger has a longitudinally extending groove and said locking member is slidably received in said groove for engagement with or disengagement from the recessed portion of the sleeve.

* * * * *